United States Patent
Barnes et al.

(10) Patent No.: US 12,120,240 B2
(45) Date of Patent: Oct. 15, 2024

(54) APPARATUS, COMPUTER PROGRAM AND METHOD FOR USE IN TRANSFORMING DATA TYPES

(71) Applicant: VOCALINK LIMITED, London (GB)

(72) Inventors: Julian Robert Mark Barnes, Hertfordshire (GB); Clifford Norman Russell, Surrey (GB); Erick Lopes Da Silva, Hertfordshire (GB)

(73) Assignee: VOCALINK LIMITED, London (GB)

( * ) Notice: Subject to any disclaimer, the term of this patent is extended or adjusted under 35 U.S.C. 154(b) by 174 days.

(21) Appl. No.: 16/953,108

(22) Filed: Nov. 19, 2020

(65) Prior Publication Data

US 2021/0176068 A1    Jun. 10, 2021

(30) Foreign Application Priority Data

Dec. 6, 2019   (EP) .................................... 19214189

(51) Int. Cl.
*H04L 9/32*   (2006.01)

(52) U.S. Cl.
CPC ............ *H04L 9/3236* (2013.01); *H04L 9/321* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,394,646 B1 * | 8/2019 | Kaufman | ............ G06F 11/1004 |
| 2005/0278272 A1 * | 12/2005 | Ornstein | ............... G06F 40/143 |
| 2008/0005086 A1 * | 1/2008 | Moore | .................. G06F 16/955 |
| | | | 707/E17.112 |
| 2009/0193256 A1 * | 7/2009 | Takenaka | .............. H04L 9/3249 |
| | | | 713/176 |
| 2011/0072278 A1 | 3/2011 | Izu et al. | |
| 2013/0173782 A1 * | 7/2013 | Ragutski | ................. G06F 21/51 |
| | | | 709/224 |
| 2013/0232041 A1 * | 9/2013 | Nuggehalli | ............ G06Q 40/10 |
| | | | 705/30 |
| 2014/0304825 A1 * | 10/2014 | Gianniotis | .......... H04L 63/0407 |
| | | | 726/26 |
| 2015/0128032 A1 | 5/2015 | Staykov et al. | |

(Continued)

FOREIGN PATENT DOCUMENTS

CN    101360100    2/2009

OTHER PUBLICATIONS

Extended European Search Report issued in European Patent Application 19214189.3, dated May 27, 2020 (20 pgs.), to which the instant application claims priority.

(Continued)

*Primary Examiner* — Jeffrey C Pwu
*Assistant Examiner* — Mayasa A. Shaawat
(74) *Attorney, Agent, or Firm* — Harness, Dickey & Pierce, P.L.C.

(57) ABSTRACT

An apparatus is described that comprises: communication circuitry configured to receive from a submitter, over a network, a data item being of a first data type and processing circuitry configured to: transform the first data type to a second, different, data type; remove non-significant content from the data item in the second data type; generate a hash of the data item having non-significant content removed to be signed; and provide the hash for signing.

18 Claims, 7 Drawing Sheets

(56) References Cited

U.S. PATENT DOCUMENTS

2017/0139914 A1* 5/2017 Newman ............... H04L 51/42
2017/0155561 A1* 6/2017 Raghavan ............ H04L 43/091
2021/0176047 A1   6/2021 Barnes et al.

OTHER PUBLICATIONS

Extended European Search Report issued in European Patent Application 19214184.4, dated May 27, 2020 (20 pgs.). EP 19214184.4 has common subject matter, the same inventors and the same applicant, Vocalink Limited, as the instant application.
U.S. Appl. No. 16/953,126, filed Nov. 19, 2020, Barnes et al.

* cited by examiner

APPARATUS, COMPUTER PROGRAM AND METHOD FOR USE IN TRANSFORMING DATA TYPES

CROSS-REFERENCE TO RELATED APPLICATION

This application claims the benefit of, and priority to, European Patent Application No. 19214189.3 filed on Dec. 6, 2019. The entire disclosure of the above application is incorporated herein by reference.

FIELD

The present disclosure/technique generally relates to an apparatus, computer program and method.

BACKGROUND

This section provides background information related to the present disclosure which is not necessarily prior art.

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Modern electronic systems rely upon trusted data messages (hereinafter called "data items") to be electronically transferred between parties. In many instances, it is necessary (or at least desirable) to prove that the data item was created by a known creator or sender (authentication), that the creator or sender cannot deny having sent or published the data item (non-repudiation), and that the data items have not been altered (integrity). Digital signatures are commonly used as the method for providing such proof.

Signing such data items has to address a number of problems.

Firstly, data items, such as files, may be provided in many formats. In other words, data items may be provided in PDF, XML, GIF, TIF or MP3 format, or the like. This means that specific software, or at least software that complies with certain standards, has to be provided to sign content dependent upon the format of the data item. This is expensive and inconvenient for the user.

Further, in order for a digital signature to remain valid, the input which was used to create the data item must not be changed. This includes not only changes to significant content of the data item (which is the data that is to be relied upon) from non-significant content, such as metadata associated with the data item, non-significant white space with the data item (where the data item is textual) and characters used by the operating systems. Different operating systems and file transfer methods have conventions that can lead to such changes being introduced simply through copying a file.

Secondly, data items and their signatures are often created separately and are not stored within the data item itself as so doing would render the original signature invalid. As such, the two files need to be transmitted separately, or contained within a wrapper message as the file cannot verify itself. This is computationally expensive as additional protocols are required.

Thirdly, once the content of the data item is verified and loaded into another application, often the original data item cannot be discarded and must be retained for as long as the risk of repudiation exists. This requires data storage archive which may require maintenance for decades. This requires a very large amount of storage, especially for large data items.

Fourthly, data is often transmitted over interfaces that carry only the data items needed. This is because it is more efficient where speed is important, or network bandwidth is expensive. Many file formats, such as XML, however, are relatively verbose and include much redundant content, so many modern interfaces use fast lightweight APIs to transmit only the data required. Historically, digital signatures typically required the whole message which increases network traffic.

It is an aim of embodiments of the present disclosure to address one or more of these issues.

SUMMARY

This section provides a general summary of the disclosure, and is not a comprehensive disclosure of its full scope or all of its features. Aspects and embodiments of the disclosure are set out in the accompanying claims.

According to the present disclosure, there is provided an apparatus comprising: communication circuitry configured to receive from a submitter, over a network, a data item being of a first data type and processing circuitry configured to: transform the first data type to a second, different, data type; remove non-significant content from the data item in the second data type; generate a hash of the data item having non-significant content removed to be signed; and provide the hash for signing.

Other features of the disclosure are provided in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings. Further areas of applicability will become apparent from the description provided herein. Again, the description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. That said, a more complete appreciation of the disclosure and many of the attendant advantages thereof will be readily obtained as the same becomes better understood by reference to the following detailed description when considered in connection with the accompanying drawings, wherein.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure.

Figure 1:
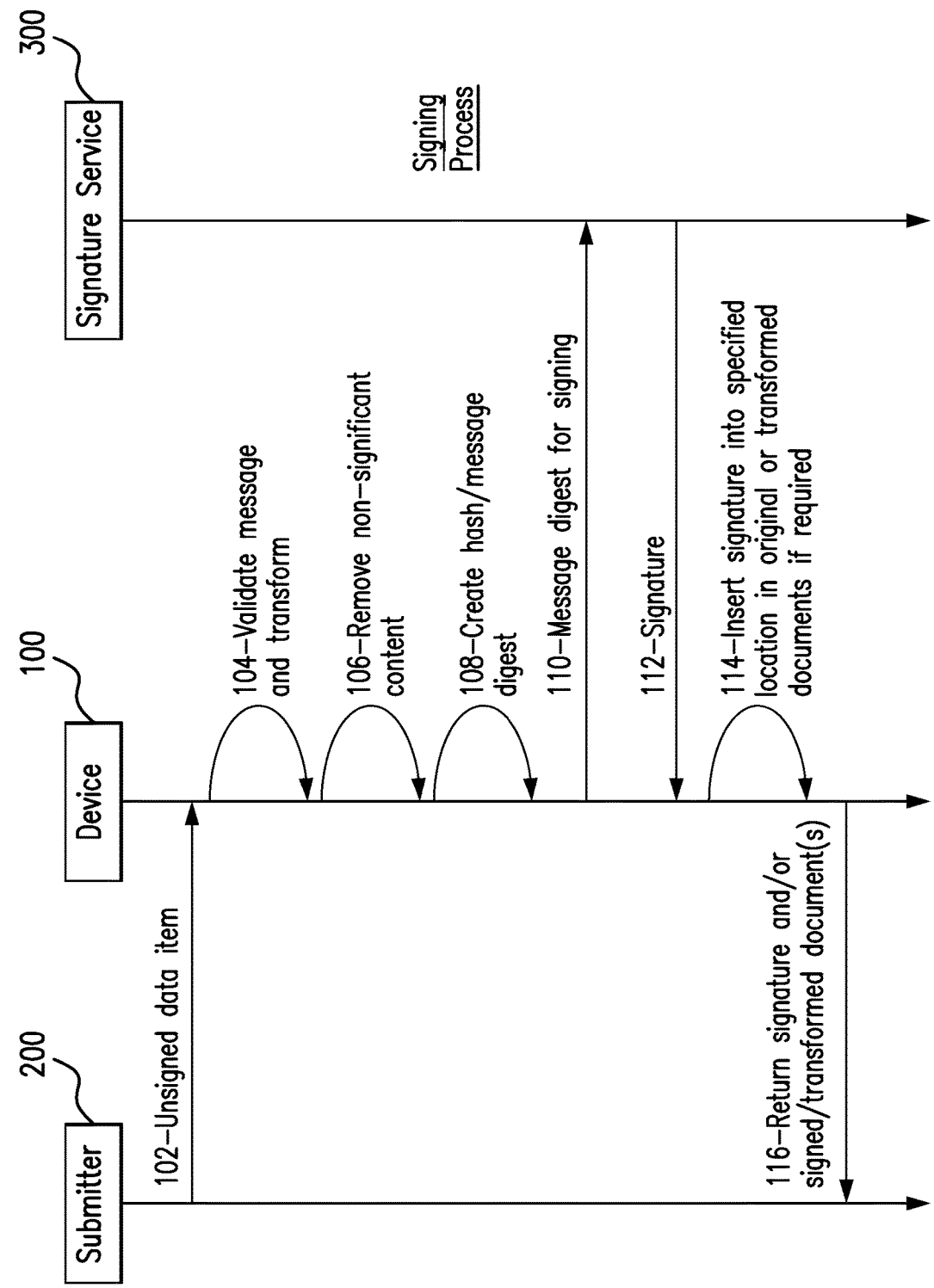
FIG. 1 shows a signal diagram of the signing process according to embodiments.

Referring to FIG. 1, a signalling diagram describing the signalling between a submitter 200 of a data item to be signed, a device 100 according to embodiments of the disclosure and a signature service 300 is shown.

The submitter 200 submits a data item to be signed. In embodiments, the submitter 200 may be a financial institution, such as a bank, sending an image of a paper cheque or may be a user sending personal information, such as passport information to a Government Agency using a computer or mobile phone. A data item may be a message that contains one or more data fields and/or may also contain one or more images having one or more objects located therein (the objects being potentially binary encoded as images of character strings) or may be a batch of records each containing information pertaining to a transaction. As hinted at above, one example of an image is an image of a cheque used to purchase goods or services and the character strings in this instance may be a bank account number and sort code. As will be explained in FIG. 2, the data item is a data type that may be processed as eXtensible Markup Language (XML), Comma Separated Values (CSV), or the like, and the binary encoded attachments may be in Portable Document Format (PDF) or Joint Photographic Experts Group (JPEG). This is generally referred to as the first data type hereinafter.

In this regard, a data item may be any kind of message that requires a signature to be applied.

The submitter 200 sends the unsigned data item to the device 100 in signal 102. The device 100 is connected to the submitter 200 via a network, such as the internet, a private network, local area network or any kind of network. It should be noted that prior to the transmission of the unsigned data item in signal 102, the submitter 200 and the device 100 may perform authentication of the communication channel to ensure the security of the channel.

It should be noted that the submitter 200 may send the data item as an individual file, as a data stream or via an Application Program Interface (API) over a channel.

After the device 100 receives the unsigned data item from the submitter 200, the data item is recognized as being acceptable and is validated. If the data item is of an appropriate type, and supported, then an appropriate processing mechanism is selected. This is described as step S4 in FIG. 2.

In step 104, the device 100 may conditionally transform the data item from the first data type to a second, different, data type, if necessary. This is explained in steps S5 and S6 in FIG. 2.

In step 106, non-significant content is removed from the optionally transformed data item. This is explained in step S7 in FIG. 2.

In step 108, a hash or digest is created from the data item having the non-significant content removed and the significant content being in a reputable standardised form derived from many variables of input. This is explained in step S8 and S9 of FIG. 2.

In step 110, the hash or digest is optionally sent to a signature service 300 for a signature to be created. In embodiments, the signature service 300 is connected to the device 100 via a network, such as a wide area network or local area network. It should be noted that although the signature service 300 is shown as being separate to the device 100, the disclosure is not so limited. In embodiments, the selection of the load or network may be chosen based on the processing level required. The signature service 300 may be, for example, a software module run by the device 100 itself. This is explained in steps S10 and S11 of FIG. 2.

In step 112, the generated signature is returned to the device 100 from the signature service 300. This is explained in step S12 of FIG. 2.

In step 114, the device 100, in embodiments, may insert the signature into the data item. For example, the signature may be inserted into the original data item, the transformed data item or the data item (transformed or otherwise) with the non-significant content removed or may be provided separately in a separate file or in a different form. Of course, the disclosure is not so limited and as explained in step S13 of FIG. 2, the data item and the signature may be processed in many ways.

In step 116, the signature or a digest of the message is returned to the submitter 200. The signature may be returned independently of the data item or may be inserted and returned with the data item (transformed or otherwise). This is explained in more detail in steps S14 and S15 of FIG. 2. Typically, the signature will be smaller in size than the data item to which it relates. Therefore, by sending the smaller data item independently of the data item (and either relying on the data item being stored elsewhere or being stored locally), the network resource required is less.

Referring to the flow chart of FIG. 2, a process according to embodiments of the disclosure will be described. Specifically, in FIG. 2, a process showing the mechanism for signing a data item according to embodiments is described. This will be carried out by processing circuitry 105 in FIG. 7.

The process starts at either step S1 or step S2. In one instance, the data item is received by communication circuitry 120.

Figure 7:
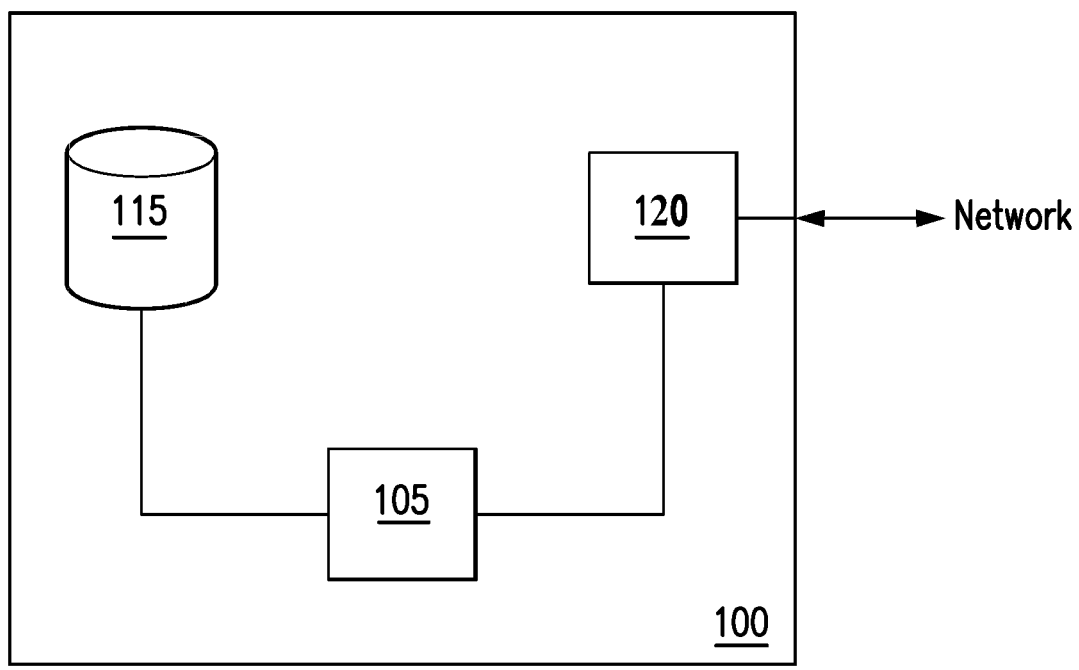
FIG. 7 shows a device 100 according to embodiments of the disclosure.

In the case of step S1, the data item may be retrieved from a particular location on the network or may be retrieved from storage 115 within the device 100 of FIG. 7. For example, in one non-limiting embodiment, the data item may be retrieved from a financial institution located on the network. The data item may be identified as any particular format, such as PDF or eXtensible Markup Language (XML) format. The presence of such a recognized data item will start the process of FIG. 2.

In the case of S2, a user accessing the device 100 may start the process by presenting a data item to an Application Programming Interface (API). The data item may then be sent to the device 100.

Figure 2:
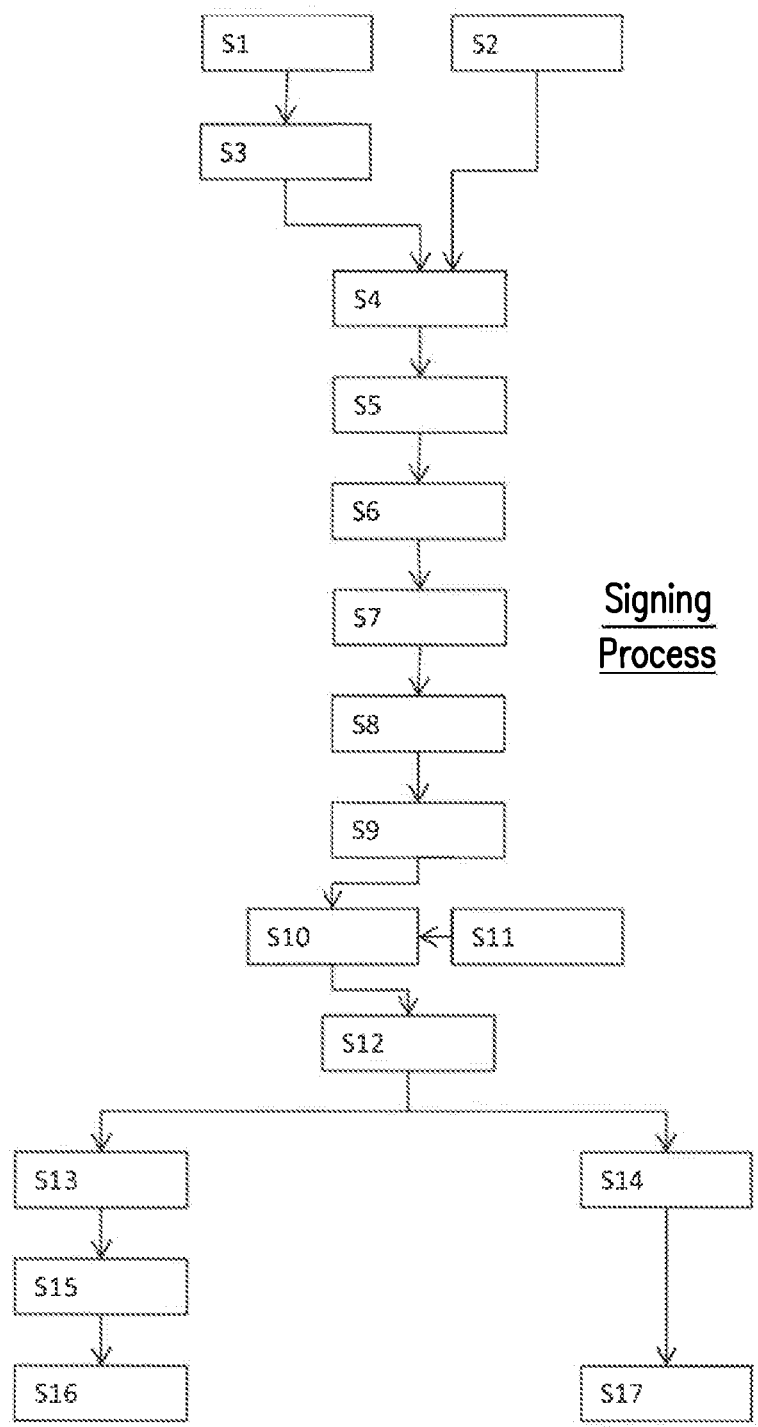
FIG. 2 shows a flow chart explaining the signing process according to embodiments of the disclosure.

It should be noted here that the entire data item does not need to be provided to the device 100 before the process of FIG. 2 starts. In other words, the device 100 may commence processing the data item as the data item is being received by the device 100. This is the case where the source of the data item is trusted. This is advantageous because processing of the data item may commence before the entire data item is received. This may be particularly useful in real-time markets where the processing of data items in real-time is important.

Moreover, the entire data item does not require storage prior to processing which reduces the storage requirements.

In the event that the process starts at step S1, the process moves to S3. In step S3, the data item may be processed when the presence of the data item is detected by a daemon, or other such background process. Of course, the process may be initiated in any manner such as when an operator invokes the process using a Graphical User Interface (GUI) or command line instruction or when an application that typically would have created the data item or wishes to transmit a signed file which is not yet signed, remotely invokes the process according to embodiments of the disclosure. Further the process may be initiated on the commencement of streaming the data item to the device 100 or appears at a defined location on a network.

The process of step S2 and S3 moves to step S4. In step S4, the data item provided over the communication circuitry 120 is validated. During the validation process, a processing mechanism is established. The processing mechanism defines the parameters and processing steps that are to be applied to the data item and is established based on the format of the data item (i.e., the file type of the data item, such as PDF, GIF, XML, or the like) and/or the particular provider of the data item (for example, the financial institution from which the data item originates and/or the submitter 200) and/or for a particular data item (i.e., one particular data item may have a particular mechanism to be applied to it) and/or data values within the data item.

The process of step S4 will be described in more detail with reference to FIG. 3 later.

Returning to FIG. 2, the process moves to step S5. In step S5, the data item is optionally transformed as defined in the processing mechanism to comply with a second format. As an example, the content of one field within the data item in the original data type is mapped to a corresponding field within a second data type or is mapped to a different value. Of course, in the event that the original data type is the same as the second data type, this step is not required. It is possible that in step S5, the bank account and sort code may be validated to ensure that the data type is consistent. Any extraneous information within the data item may optionally be removed at this stage to comply with such a data type. Examples of the data type include XSLT and ISO20022.

In one example, the data item may be provided as a PDF data type. In this case, the fields within the PDF data item are mapped to corresponding fields within the second data type which may be, in embodiments, XML. This can be achieved using software, such as Map Force by Altova®, or the like. Of course, the disclosure is not so limited and any kind of mapping from the fields of one data item to a second data item is envisaged.

In the event that the original data item contains an image, such as a GIF, TIFF or JPEG, validation of the image may be required. This may be performed by a trusted third party who performs optical character recognition and signs the image and the associated text. This may need to be performed prior to step S5 in order to produce fields that may be mapped to a second data type, such as XML.

Although the second data type may be any suitable data type, XML is particularly advantageous. This is because XML is a flexible structured language and so can support mapping from many original data types.

One form of XML is known which has a form defined in W3C Canonical XML V2.0. As will be explained later, this conceptual form (which is believed not to have been developed into a working product or prototype) has been developed further by the inventors so that it does operate and has been further developed and enhanced over the original concept. The use of this form further standardises the content within the data item so that only significant content is provided within the data item ensuring that the digital signature is more robust and may be sent separately to the data item once signed rather than being contained within a wrapper message. In other words, this canonicalization removes the non-significant content from an XML file.

In embodiments, the original data type may be a data type suitable for manual editing, such as Excel (and during recognition binary object PDF) or may be chosen to allow more readily available software to generate the original data item. For example, the original data item may be created using Microsoft Office®, or a webform. Indeed, by transforming the data item from the original data type to a second (standardised) data type allows increased accessibility for people. For example, if the user is visually impaired, the first data type may be suitable for creating braille text meaning that the visually impaired person knew what was being submitted. In general terms, semantically the same, but syntactically different formats may be saved in more accessible forms.

Submitters may submit the original data item in any format and if the original data item is transformed into the second data type, the device 100, according to embodiments, will handle such data item in the same manner as any other data item for signature. This reduces computational expense.

The process then moves to step S6 where the data item in the second format is provided. This may be as a result of the transformation process of step S5 or, where the second data type is the same as the first data type, follows from step S4.

The process moves to step S7 where the data item in the second format has non-significant content removed. In this context "non-significant content" means content that, if removed, does not alter the information conveyed in the data item; in other words, the data item is semantically the same.

In the embodiment where the second data type is XML, one mechanism for removing the non-significant content is canonicalization of XML. As noted above, one form of XML canonicalization is defined in W3C Canonical XML V2.0.

The canonicalization technique described in the W3C Canonical XML V2.0 document was further developed by these inventors. These developments and associated advantages, will now be described.

(1) In order to reduce the likelihood of character set mismatches, all data items are UTF-8 encoded (if the data item is not supplied in UTF-8 encoding). This improves the robustness of the canonicalization technique especially where data items are cross border messages as different countries use different local encoding for which UTF-8 is a superset of all of these local encoding techniques.

(2) All canonicalization input data items will include a Byte Order Mark (BOM). Where the input data item does not include a BOM, a check may be added in step S5 identifying the encoding of the data item in the second format. The BOM is a way of detecting the encoding (for example, UTF-8). Knowing the data item is in UTF-8 as a declaration avoids the need for data items to be re-encoded into UTF-8. An option to disable this check may be provided, although this carries a potential risk of incorrectly encoded messages being processed.

(3) Optional Element Removal is provided. The W3C Canonical XML V2.0 document makes no mention of how to process empty optional elements as defined in a schema within an XML file. For example, suppose a name is to be canonicalized, and the required fields are FirstName and Surname, and there is an optional middle name; should the Canonical form of John Doe be "<FirstName>John</FirstName><Surname>Doe</Surname>", or "<FirstName>John</FirstName><MiddleName></MiddleName><Surname>Doe</Surname>", or "<FirstName>John</FirstName><MiddleName/><Surname>Doe</Surname>".

All three options are logically equivalent. According to embodiments of the disclosure, the data item in the second format should validate against a schema, and that if elements are marked as optional in the schema, unless they have content, the XML tags should not be included. This improves the robustness of the canonicalization and reduces the size of the messages and makes portability more reliable.

(4) Support for Self Closing Tags is provided. Embodiments of the disclosure support the more modern XML form of self closing tags than present in W3C Canonical XML V2.0. These are important where there is a mandatory field, but the content is blank. Consider the artist known as Prince in the above example. A message requires a value for first name and surname but will accept a NULL value for FirstName. Embodiments of the disclosure see both of these forms when Canonicalized as equivalent:

"<FirstName></FirstName><Surname>Prince</Surname>"

"<FirstName/><Surname>Prince</Surname>"

This improves the robustness and portability of the canonicalization.

(5) Carriage returns and line feeds are a problem in known canonicalization processing. This is due to differences in encoding between some operating systems; the propensity of some programs and file transfer protocols to change to one form or another and so on. In embodiments of the disclosure, all relevant carriage return and line feed characters are encoded, all others are removed. The canonicalized data item in the second format is always a single line.

(6) In embodiments, all non-relevant whitespace between elements is removed. This increases the robustness of the canonicalization process and improves portability.

(7) Any existing content is deleted that exists in both the target location for the signature and within the data item to be signed. It is always non-relevant. Such a situation may occur where, for example, a value for a second counter signature is provided where message 1 becomes message 2 and message 1 cannot enter the message 2 queue unless it is correctly signed. As there cannot be two signatures in a single location, any existing input is ignored. Therefore by deleting content that exists in both the target location for the signature and within the data item to be signed improves robustness.

An example of this content deletion is now provided.

The xPath in a data item is typically in a location like this: Document/PrevslyPdDbtItmSubmissnAckNak/GrpHdr/Sgntr.

The pre-existing signature may be: <n1:Sgntr>UjBsR09EbGhjZ0dTQUxNQUFBUUN BRU1tQ1p0dU1GUXhEUzhi</n1:Sgntr>

This signature must be changed to <n1:Sgntr></n1:Sgntr> or <n1:Sgntr/> before canonicalization is attempted, where the n1 prefix is adapted to the actual location of the field within the data item as required. This example also assumes the signature is a mandatory field in the XML schema used for validation. In the event that it is optional, the optional tag processing rule takes precedence and all traces of the signature and its tags would be removed.

(8) Comments are removed as these are an example of non-relevant text that submitters of data items may introduce for a variety of reasons. All comments are removed according to embodiments of the disclosure. The output data item can be specified as the original data item with a signature injected, or the canonicalized version of the data item with signature injected or enveloped forms with attached signatures. The former allows comments to be passed that facilitate debugging or local management information to be included if required. The latter represents the bare minimum equivalent message that will increase performance. This allows users the option of retaining or removing, while unequivocally ensuring non-significant comments are not part of the signature. In W3C Canonical XML V2.0 comments are retained, which increases the risk of Straight Through Processing failures.

(9) W3C Canonical XML V2.0 allows users to choose whether or not to trim text nodes. This creates uncertainty. In embodiments of the disclosure, all text nodes are trimmed (i.e., remove leading and trailing whitespaces) when canonicalizing. Adjacent text nodes must be coalesced prior to trimming. Where leading and trailing spaces are significant, then the validation schema should have an xml:space="preserve" attribute associated with the element, then text node descendants of that element are not trimmed. This improves overall robustness and improves portability.

(10) W3C Canonical XML V2.0 allows users to choose none or sequential prefix rewrite. With none, prefixes are left unchanged, with sequential, prefixes are changed to "n0", "n1", "n2" . . . except the special prefixes "xml" and "xmlns" which are left unchanged. In embodiments of the disclosure, by default the "none" option is not supported as this increases the risk of failure. By mandating one solution only, robustness and portability are improved.

It is possible to allow "none" in embodiments. If prefixes are required in the data item being returned (typically as the namespace prefix has some additional meaning), the option to inject the signature back into the original data item should be used. If the canonicalization form of a message according to embodiments of the disclosure is supported, this can also be chosen. Supporting only Sequential XML Prefix Rewrite improves robustness, may reduce file size (where the canonicalization form according to embodiments is acceptable for transmission and verbose name space prefixes are used) and will improve portability.

(11) In XML, a qualified name (QName) is a name subject to namespace interpretation. Given that different users may use locally different namespaces, or no namespace at all, embodiments of the disclosure only supports the empty set model. In conjunction with the XML Namespace Prefix Rewrite rule, this creates a reliable single method for canonicalizing the widest range of messages and for developers to be able to validate their content against their own local schemas. QNames in content should be transformed into non-qualified names during the optional transformation in step S4.

(12) The W3C Canonical XML V2.0 paper notes that in some cases, particularly for signed XML in protocol applications, there is a need to canonicalize a subdocument in such a way that it is substantially independent of its XML context. This is because, in protocol applications, it is common to envelope XML in various layers of message or transport elements, to strip off such enveloping, and to construct new protocol messages, parts of which were extracted from different messages previously received. If the pieces of XML in question are signed, they need to be canonicalized in a way such that these operations do not break the signature but the signature still provides as much security as can be practically obtained. All of these protocols are adopted in embodiments. By mandating them, signatures become more robust and portability is improved.

(13) All XPaths within a document are fully escaped. This can be achieved in step S4 if not mandated by the output of the system creating the data item. This rule provides consistency and certainty which increases robustness and thus improves portability.

The W3C Canonical XML V2.0 note points out that difficulties arise due to the loss of the following information not available in the data model: (a) base URI, especially in content derived from the replacement text of external general parsed entity references; (b) notations and external unparsed entity references; and (c) attribute types in the document type declaration.

Embodiments of the disclosure overcome this by prohibiting the use of any of the content forms above for carrying relevant data. The problem will be mitigated using the transform process of step S4. This is because any significant text in these unsupported forms will be mapped into permitted structures. These permitted structures will be validated and signed. This increases portability and robustness.

(14) If field values (i.e., non-XML whitespace) within the XML file contains either carriage returns or linefeeds, embodiments of the disclosure will translate both the two-character sequence #xD #xA and any #xD that is not followed by #xA to a single #xA character. This caters consistently for both UNIX and DOS variants. This approach ensures a consistent robust process that improves portability.

Also, the transform step of S4 may be used to transform the content of the data item to an acceptable format and insert the signature back into the original message.

After the data item in the second format (data type) has had non-significant content removed and in embodiments, been canonicalized, the process moves to step S8. In step S8, the canonicalized form of the data item in second format is hashed using, in embodiments, an SHA-2 256 hashing algorithm. Of course, any suitable hashing algorithm may be used.

The output of the hashing algorithm is a generated hash that is a text string. This is provided in step S9.

The process moves to step S10 where the text string in S9 is signed. It should be noted here that the signing process itself may be carried out within device 100 using a known signing tool or may be carried out using a separate signing service. The signing process uses the signer's private key and certificate which may be supplied using a known technique. Alternatively, a default value can be used if the signer does not provide a private key. The device 100 thus provides the hash for signing either to itself or to an external signature service 300. If no signing is performed, it is possible to use the hash (with the hash matching the message). The hash is then treated as the signature.

The process moves to step S12 where the message signature is returned from the signing process. The returned signature is a text string.

The flow chart then moves to either step S13 or step S14.

In the event that the flow chart moves to step S13, the signature is processed according to a manner defined in step S4. In other words, the flow chart of step S13 processes the signature and the data item in a manner according to one or more of the identity of the user providing the data item to be signed, the identity of the data item to be signed (i.e., the unsigned data item itself may define how the signature will be handled), the file type of the data item (i.e., according to whether the unsigned data item is a PDF file, a CSV file, or the like), or in a default manner.

The options for the signature are as follows.

(1) Just the signature is returned to the submitter. In other words, only the signature is returned to the submitter without the data item being provided to the submitter. This is advantageous where the submitter already has the data item locally and only wants the signature to complete the process. This saves network bandwidth and is especially useful where signatures on portable terminals are required. The submitter may then store the signature in association with the locally stored data item for retrieval later if necessary.

(2) The canonicalized form of the data item is optionally returned to the submitter and the signature may be stored at a location. The location may be provided in the returned data item (using a Unique Resource Identifier (URI), or the like) or may be predetermined by the submitter. As the canonicalized form of the data item only contains pertinent information, and as the location may be predefined or the location provided in a shortened form, this is a quick mechanism to provide the signed data item.

(3) The signature is optionally inserted into the original data item and the signed data item may be stored in a defined location. This mode allows preservation of the original form of the data item if desired. A URI, or the like, defining the location may be returned to the submitter. Of course, the location may be defined by the submitter. By inserting the signature into the original data item and storing the signed data item, human readability may be aided and also allows non-relevant text, including comments and the like, to persist. Provision of non-relevant content, such as text, may have value to users as the non-relevant text may express processing instructions or preferences, where such information does not alter the semantics of the underlying message.

(4) The data item may be transformed into a new format or data type. For example, the data item may be transformed into a PDF, CSV, Excel File and/or proprietary file type. The transformed data item may be stored at a location or returned to the submitter. The signature can be inserted within the transformed data item at a location within the transformed data item. This location may be defined by the submitter in advance or may be defined by the submitter in the original data item or may be defined by the device 100 and sent to the submitter. The benefit of this option is that submitters can maintain local copies of data items in forms that work for them and which can be maintained in that form. This can help avoid the need for complex proprietary and often expensive message handling systems for users where volumes are low, but a capability is required.

(5) The signed message may be presented in an onscreen form to the submitter for manual editing and/or inspection.

Of course, any combination of the above is envisaged. For example, any combination which allows for detached, enveloped and enveloping models of signing, and also for submitting a data item in a form that is different from that archived locally, while maintaining a valid signature through the portability properties is envisaged.

The process then moves to step S15. In step S15, the output data item and the signature is generated. As noted above with reference to step S13, the output data item may be signed itself or the signature returned separately to the submitter. In addition, in embodiments, a file-naming convention for the output data item and/or signature is provided. The file-names are designed to aid submitters in understanding the content of the returned data item and may include one or more of the following: Static Text Prefix; Input Data Item Name; Data Item Type (this is provided from step S4 and indicates the processing mechanism); User Group of submitter; User Name of submitter; Date/Time including ISO Date/Time and Julian calendar models; Unique Sequence Identifier (choice of numeric or alphanumeric sequences), where the sequence identified can be globally unique, or sequentially unique to a user name or user group; Message Suffix and File Type. This is typically the file type, e.g., XML XLS or PDF; but can also be used for ".ERR" whereby an error report can be placed in a specified location; etc.

The flow chart then moves to step S16 where the process ends.

As noted above, instead of moving to step S13, the process may move to step S14 where the process of step S4 defines the mechanism for returning the signature and/or signed data item to the submitter via the API. In embodiments of the disclosure, the signature is returned to the submitter via the API and the signed data item in the canonicalized form may be sent and stored within a location. This location may be defined in advance or may be provided to the submitter as a URI, or the like. The submitter may then store the signature in association with the location of the signed canonicalized form. Other non-limiting mechanisms include sending the signature via the API and storing the original data item at the location. Further, the signature may be returned to the submitter and the signed data item in the prescribed manner may be directly sent to another location. The submitter then can store the signed data item in any desired format.

After step S14, the flow chart moves to step S17 where the process ends.

Figure 3:
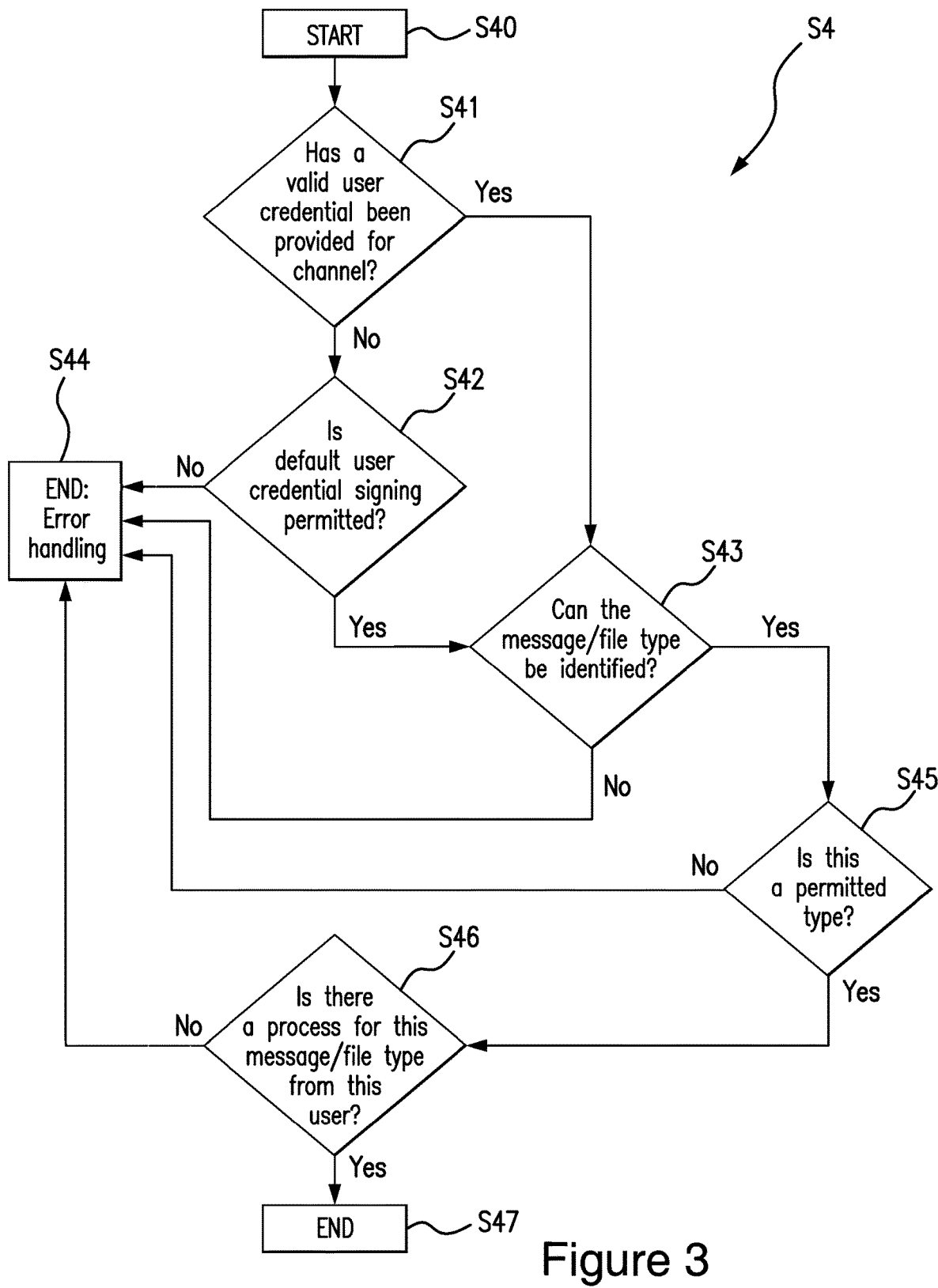
FIG. 3 shows a flow chart explaining the choosing of a processing mechanism in step S4 of FIG. 2.

Referring now to FIG. 3, the process of step S4 is shown in more detail.

The process starts in step S40. The process moves to step S41 where the channel over which the data item is provided is checked. In this check, it is determined whether a valid user credential has been provided for the channel. This is a known process in the art of data item communication and verification and so will not be described in any detail for brevity. This is particularly useful for streaming large data items. This is a pre-emptive validation of the channel and may be achieved by analyzing the start of the data item as would be appreciated by the skilled person.

In the event that there has been a valid user credential provided, the "yes" path is followed to step S43. In the event that there has not been a valid user credential provided, the "no" path is followed to step S42.

In the event that the path is followed to step S42, a check is carried out to determine whether default user credential signing is permitted. Again, this is a known process in the art of data item communication and verification and so will not be described in any detail for brevity.

In the event that default user credential signing is not permitted, the "no" path is followed to step S44. At step S44, the process ends as there is an error. The process in step S44 follows an error handling procedure which may include returning an error message to the submitter.

On the other hand, if default user credential signing is permitted, the "yes" path is followed to step S43.

In step S43, a check is made to determine if the file type of the data item can be established. In other words, a check is made to determine whether the file type is a PDF, XML, XLS, CSV file type, or the like. In the event that the file type cannot be determined, the "no" path is followed to step S44 where the process ends with error handling or optionally singed as binary object with a detached signature.

On the other hand, in the event that the file type can be determined, the "yes" path is followed to step S45.

In step S45, a check is made to determine whether the received file type is permitted. In this context, a file type may be permitted where the file type is in the first data type and there exists a mapping from the first data type to the second data type. In other words, as an example, the received file type may be a PDF file type and, as explained above, there is provided a mapping between the PDF file type and the XML file type of the second data type. Therefore, using this criterion, PDF is a permitted received file type. Of course, other criteria are envisaged such as the received file type being the same as the second data type, meaning that no transformation is required.

In the event that the received file type is not a permitted file type, the "no" path is followed to step S44 where the process ends with error handling. However, in the event that the received file type is a permitted file type, the "yes" path is followed to step S46.

In step S46, a check is made to determine if there is a processing mechanism defined for this particular permitted file type for the submitter of the data item. In other words, in embodiments, the submitter of data items defines the processing mechanism it requires for each permitted file type. A typical processing mechanism will be described hereinafter.

In the event that there is no defined processing mechanism for data type sent by the submitter, the "no" path is followed to step S44 where the process ends with an error handling routine. Of course, the disclosure is not so limited and in the event that no processing mechanism is defined, a default processing mechanism may be implemented for that data type.

In the event that there is a defined processing mechanism for the data type sent by the submitter, the "yes" path is followed to step S47 where the process ends. The processing mechanism is then passed to step S5. It should be noted that a submitter may have a plurality of processing mechanisms for a particular data type. In this case, the first identified matching processing mechanism will be used in step S5.

As noted above, a typical processing mechanism will now be described.

In embodiments, a processing mechanism contains one or more of the following features.

(1) Authorized Submitter Details. This identifies the submitter and may be a globally unique identifier, such as username, or may be unique within an organisation, such as a bank. In embodiments, one or more of the following is provided.

(a) Anonymous mode (if enabled). This allows for messages to be signed to prove date and time of submission/receipt; or for non-verified user credentials; or for the use of a common signing certificate.

(b) User Names: (i) User ID Name (and proxies). This is a unique character string uniquely identifying a user; (ii) Permitted Certificates (or default). This identifies the certificates the submitter may use or whether the submitter will use the default certificate (see step S11); (iii) User Group(s). This identifies groups to capture users with common signing requirements for example a "Director" or a "Bank Customer", or the like; (iv) Permitted file Types (including options for default/all). These are assigned to the submitter on a personal basis in addition to those permitted within the user groups. See step S46.

(c) User Group: (i) Group Name (and proxies). This defines the name given to the User Group; (ii) Permitted Certificates to use. This defines the certificate (or default certificate) that will be used by the User Group; (iii) Permitted data item types which may be signed. This defines the data item types that the user group are permitted to submit; (iv) User Names who are members of the User Group. This defines the user names of people within the User Group; (v) Permitted operating hours/dates. This defines the hours and dates which the user group are entitled to submit. This feature aims to prevent accidental signing and submitting messages when systems are intentionally not operational; or when users should not be actively signing (for example, only during business hours).

(2) Data Item/Infoset Process. It should be noted that the term "Infoset" is a term of art and is explained in the Appendix. This defines the process associated with a particular data item or infoset.

Unique Process ID and Friendly Name. This is an identifier given to the process associated with the data item. This may be a name or other character string;

Acceptable input channels. This defines the input channels over which the submitter may submit data items for signing;

Acceptable input data types including document encoding. This defines the acceptable input data types for a data item, for example, PDF, XML, or the like. In addition, acceptable document encoding, such as UTF-8, may also be defined;

Authorized User Groups and User Names. This defines user groups and user names that are authorized to submit data items;

Signing Method(s). This defines the signing method to be used with the data item. For example, the PKCS #7 signing method.

Signing API for invocation. This defines the signing API that will be used.

Initial Transform requirements. These define the transform requirements into the second data type in step S5 explained above. For example, inbound PDF is mapped to XML. These are typically calls to optimized modules or generic Extract, Transform, Load programs using, for example, eXtensible Stylesheet Language Transform (XLST). This will include the transform to the standardized form for validation if this form is not the submitted form. As noted above, the standardized form is usually equivalent to XML and specifically, but not exclusively, to an XML message in XML v1.1 as used extensively in ISO 20022 financial message. For binary files, the content is Base64 encoded. As noted above, all input is converted to UTF-8 encoding if not in this already, although the processing mechanism may not note this specifically.

Validation Method. This defines the validation mechanism used for the submitted data item, for example, which assertive and non-assertive modules are used to validate the submitted data item. These modules are typically either schematron based for assertive validation with some business validation; or XML Schema Definition (XSD) for non-assertive validation as would be appreciated by the skilled person.

Canonicalization Method. This defines the canonicalization method used. For example, the canonicalization method according to embodiments described above may be used. Alternatively, any other canonicalization method may be used such as that defined in W3C Canonical XML V2.0. Indeed, any canonicalization method for which APIs exist may be used.

Signature Location(s). This defines the location of the signature once generated. For example, whether the signature is enveloped; or whether it is an enveloping signature or whether it is a detached signature. These terms are defined in the appendix. This also defines the location of the signature in the returned data item and or filename and date/time stamping or whether an API return is to be used.

Output message/infoset transformations. This defines whether the data item to be returned to the submitter should, for example, remain in canonical form or be saved as a copy in ASCII/PDF/CSV/Excel or other format.

Logging requirements. This defines what information needs logging; the maximum size of log file and the maximum duration for retention.

The start and end points (defined as XPaths) for the information to be signed within a given message (enabling enveloping signatures).

Of course, other criteria may be used in the processing mechanism.

Typically, when receiving the data item, in embodiments, the entirety of the data item is received at the device 100 before processing of the data item commences. However, in embodiments, the data item may be processed before the entirety of the data item is received, for example, after a predetermined number of instructions or components within the data item is received. This reduces the amount of storage required within the device 100 and increases the speed at which the signature is produced.

This embodiment is described with reference to the flow chart 400 of FIG. 4. In embodiments of the disclosure, the processing circuitry 105 within the device 100 will carry out the method described with reference to FIG. 4, typically using computer readable instructions stored on the storage 115.

Figure 4:
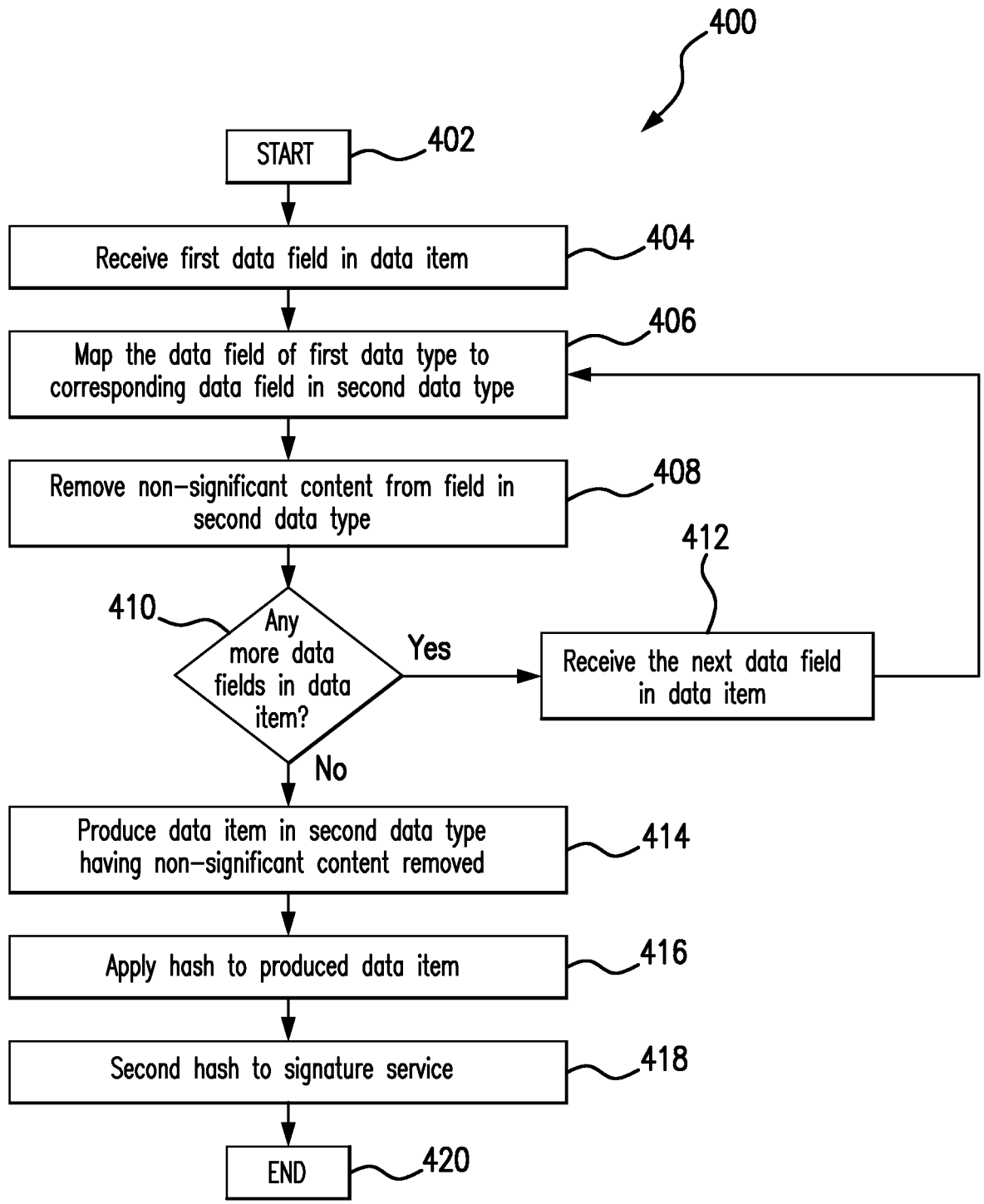
FIG. 4 shows a flow chart explaining a signing mechanism according to embodiments of the disclosure where the data item is a stream of content.

In the embodiments of FIG. 4, a data item includes a plurality of components. In this context "component" means a portion of the data item of the first data type which may be mapped to a field in a data item of the second data type.

In embodiments, a component may be determined by the content of the data item of the first data type. For example, where the data item is comprised of a plurality of data fields (such as when the data type of the data item is XML), a component may mean one of the data fields (or a place to store data) within the data item. Of course, the disclosure is not so limited.

The process 400 starts at step 402. The process 400 then moves to step 404. In step 404, the first data field in the data item is received from the submitter 200. In this example, the first data field is a component of the data item of the first data type. The process then moves to step 406 where the first data field of the data item (which is of the first data type) is mapped to a corresponding field in the second data type. So, the first data field is mapped to a corresponding field in the second data type. In other words, the process of step S5 in FIG. 2 is carried out on the first data field. Of course, like the embodiments described in FIG. 2, this step may be avoided if the first data type is an appropriate form, such as an XML schema.

The process moves to step 408. In step 408, the non-significant content within the data field in the second data type is removed. This is the same as step S7 in FIG. 2.

The process then moves to step 410. In step 410, it is determined whether there are any more components within the data item. In the event that there are more components, the "yes" path is followed step 412.

In step 416, the next component in the data item is received from the submitter 200. The process then moves to step 406.

Alternatively, returning to step 410, in the event that there are no more components, the "no" path is followed to step 414.

In step 414, a data item of the second data type is generated. This data item will have the non-significant content removed.

The process then moves to step 416. In step 416, a hash is applied to the data item of the second data type that has non-significant content removed. This is the same as step S8 in FIG. 2.

The process then moves to step 418. In step 418, the generated hash is sent to the signature service 300. This is the same as step S10 and S11 in FIG. 2. The process then ends in step 420.

By receiving the first component (which is in embodiments a data field), and mapping this to a corresponding data field in a second data type and removing the non-significant content from the corresponding data field, the memory requirements within the device 100 is reduced. Further, by performing this processing on a component-by-component basis, it is not necessary for the entire data file to arrive before processing commences. This increases the speed at which processing of the data item can take place.

In other words, the data item comprises a plurality of components. The device 100 sequentially receives the plurality of components of the data item and for each component in succession in the sequence, the processing circuitry in the device 100 is configured to remove non-significant content from the component of the data item; and after all components are received, generate a data item of a second data type containing the received components with the non-significant content removed; and generate a hash for the generated data item; and provide the hash for signing.

After the data item has been signed using any technique described above, in order to verify the integrity of the data item, a verification process will be followed. The verification process will be described with reference to the signalling diagram of FIG. 5 and the flow chart of FIG. 6.

Figure 5:
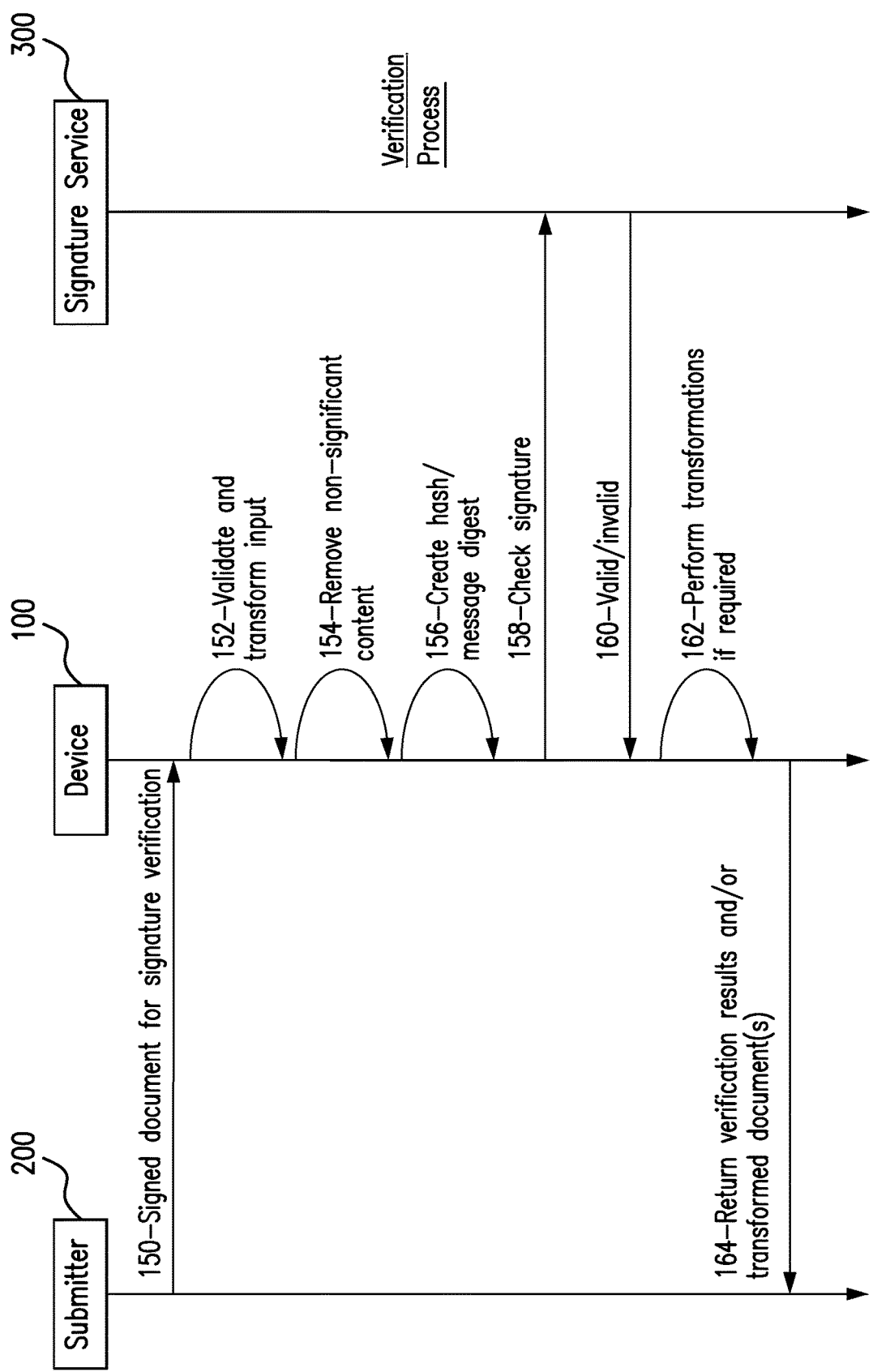
FIG. 5 shows a signal diagram of the verification process according to embodiments.
Figure 6:
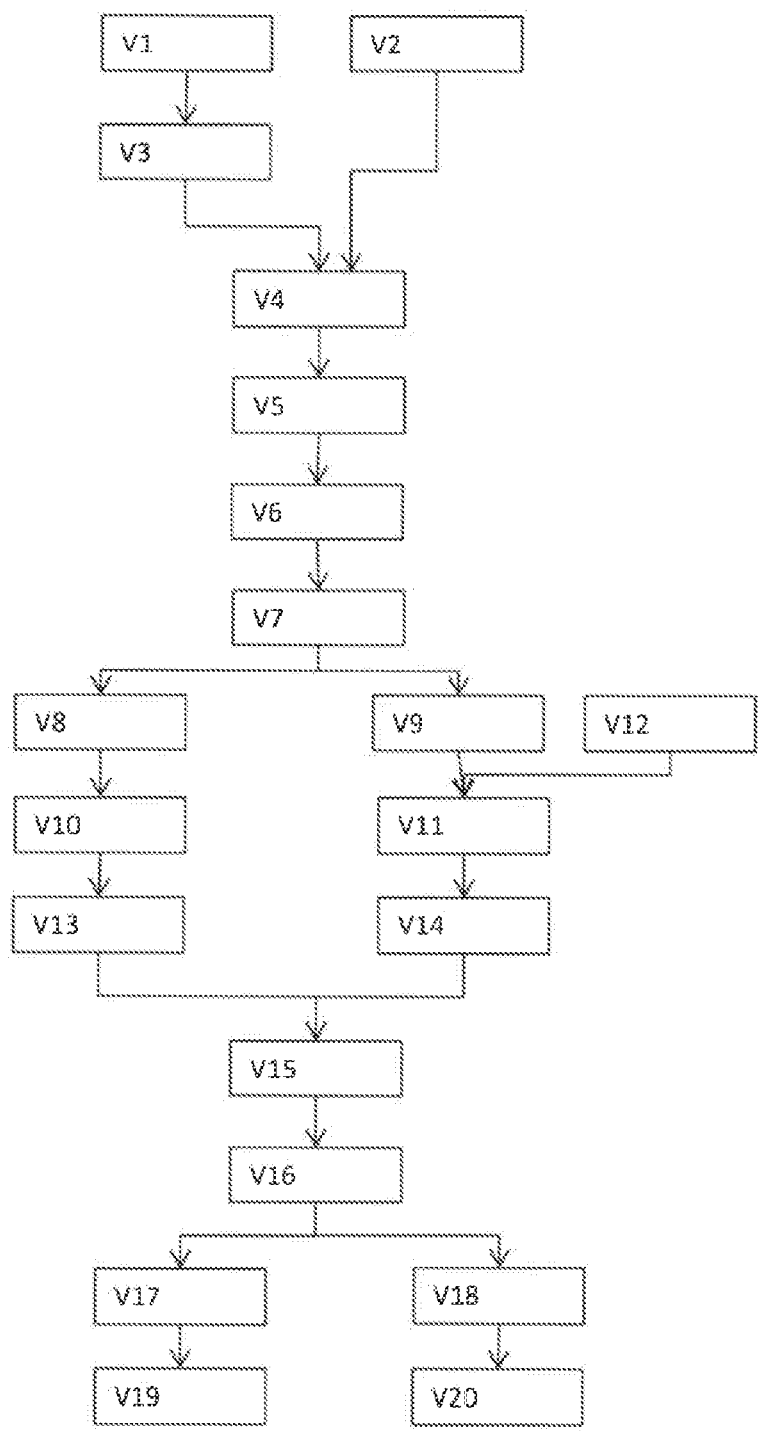
FIG. 6 shows a flow chart explaining the verification process according to embodiments.

Referring to FIG. 5, the submitter 200 sends a signed data item to the device 100 for verification. This is step 150. In a similar manner to the signing process of FIG. 1 and FIG. 2, the submitter 200 and the device 100 will communicate over a network using, in embodiments, a secure channel. It should also be noted that the signature may be sent with the data item (for example, inserted into the data item) or may be sent separately to the data item. Indeed, if the device 100 or signature service 300 has a copy of the original unsigned data item, or access to the original unsigned data item, then the data item may not be sent to the device 100. Instead, an indicator identifying the location or identity of the original unsigned data item would need to be sent to allow the device 100 and/or the signature service 300 to retrieve a copy of the original data item. This mechanism reduces the amount of data that needs to be provided by the submitter 200. This may be useful especially if the submitter 200 is a mobile phone.

After the original data item and the signature have been received (either directly from the submitter 200 or retrieved from the identified location), at the device 100, the original data item is validated and transformed to the second data type if necessary. This is step 152 and is later described with reference to steps V3, V4 and V5. These steps are the same as step S3, S4 and S5 as described with reference to FIG. 2 respectively.

If the signature was inserted into the data item when sent to the device 100, the process will remove the signature from the signed data item which is in the second data type. The location of the signature is defined in the processing mechanism of V4. The removal or retrieval of the signature is described in step V7 in FIG. 6.

The signal diagram then moves to step 154 where the non-significant content is removed. This is described in V8 below and is the same as step S7 in FIG. 2.

At the end of step 154, the verification process will have created a version of the data item received from the submitter 200 in the second data type that has the non-significant content removed. A hash of this version is then created in step 156 and as described in step V10 of FIG. 6. This produces the generated hash of step V13.

In order to verify the signature, the signature is sent to the signature service in step 158. This is step V6 of FIG. 6. The message signature is decrypted using the submitter's public key in step V12 and the decryption process occurs in step V11. The output of the decryption process in step V11 is the decrypted hash in V14. The generated hash in step V13 and the decrypted hash in step V14 are compared in step V15. In the event that the generated hash and the decrypted hash are identical, the data item is correctly signed.

The verification results (i.e., whether the data item is correctly signed, or not) is provided to the device 100 in step 160. The verification results may be converted into a status report which may be some code or a comment as defined in the processing mechanism. This is step V16 in FIG. 6.

In step 162 the verification result may be inserted into the data item as non-relevant content; for example, as a comment. This aims to assist in ensuring the portability of the signature. In addition or alternatively, the verification result may be sent to an audit log, saved as a file alongside the file, or similar. This is step V17. Aside from these differences, the remainder of step V17 is the same as step S13 which describes the mechanisms for providing the signature to the submitter 200. The provision of the verification results to the submitter is step 164.

It is also possible to return the verification results using the API. This is identified in the processing mechanism. The verification result it to be provided via the API in step V18 and is a similar mechanism described in step V18.

The process ends in step V19 and V20.

FIG. 7 shows a schematic diagram of the device 100. The device 100 is, in embodiments, a computer, or server, or the like. However, the disclosure is not so limited and the device may be a mobile telephone, tablet computer, or any kind of client. The device 100 comprises processing circuitry 105 connected to communication circuitry 120 and storage 115. The processing circuitry 105 is in embodiments controlled using computer software stored in storage 115. The storage 115 may be solid state storage or magnetically readable storage and may comprise non-transitory computer readable instructions which, when loaded onto the processing circuitry 105 will enable the device 100 to perform embodiments according to the disclosure.

The communication circuitry 120 is connected to a network. The network may be a Wide Area Network, the Internet, a Local Area Network or a Virtual Private Network, or the like.

Using the techniques described above, the processing time for applying a signature to a 500 Mb file has reduced from being unable to complete the processing by a time-out period to completing the processing within 30 seconds.

Although the above embodiments have applicability with any kind of data item in any field, the embodiments do have a specific use in the financial service sector.

The above describes data items as being messages, files, images or any kind of data. In some examples, the data item which is signed may include a batch of records. This is common especially in financial services where the embodiments of the disclosure described with reference to the Figures have a specific use.

In this case, where a data item is signed as a total entity, the same signature will always be derived. However, where a data item is generated from a batch of records, and the sequence of that batch of records cannot be guaranteed, the signature will not match.

Depending on the content of each record within the batch, the order of the records in that batch may be critical and so the order of the records within the batch of records should not be altered.

Accordingly, there are three scenarios which consider ordering of the records within a batch.

(1) Data item signing where portability is not an issue, and the records cannot or will not be re-arranged (for example, such re-sequencing is not possible within the schema)

(2) Data item signing where portability is an issue, but the sequencing of the records is not important.

(3) Data item signing where portability is critical and the sequencing of the records is important To try and address the above scenarios as options within the processing mechanism:

For scenario 1, the processing circuitry 105 operates on the data item as presented (i.e., the order of the records in the batch is unaltered).

For scenario 2, the batch of records is sorted into ascending order where the whole of the record is used for sorting purposes.

For scenario 3, a specific nominated unique value within each record is used to sequence the items before removal of non-significant content. This value should enforce the intended record order, so date/time stamps or incremental record IDs may be used. The submitted records within a batch should have such a field.

The ordering of the records in the batch may be carried out during the removal of the non-significant content (S7 or V8); or during the extract and transform step (S5 or V5). If implemented during S5 (or V5), this allows for the removal of the non-significant content to be performed. This is especially useful as it may increase overall throughput and portability.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory, or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units, or as part of other functional units. As such, the disclosed embodiments may be implemented in a single unit or may be physically and functionally distributed between different units, circuitry, and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

(1.) An apparatus comprising: communication circuitry configured to receive from a submitter, over a network, a data item being of a first data type and processing circuitry configured to: transform the first data type to a second, different, data type; remove non-significant content from the data item in the second data type; generate a hash of the data item having non-significant content removed to be signed; and provide the hash for signing.

(2.) An apparatus according to (1.), wherein the second data type is in eXtensible Markup Language, XML.

(3.) An apparatus according to (1.), wherein the processing circuitry is configured to transform the first data type to the second data type by mapping data in a first field in the first data type to a corresponding second field in the second data type.

(4.) An apparatus according to (1.), wherein the processing circuitry is configured to remove non-significant content from the data item in the second data type by canonicalizing the data item in the second data type.

(5.) An apparatus according to (1.), wherein the processing circuitry is configured to remove whitespace as the non-significant content.

(6.) An apparatus according to (1.), wherein the processing circuitry is configured to remove carriage returns as the non-significant content.

(7.) An apparatus according to (1.), wherein the processing circuitry is configured to sign the generated hash.

(8.) An apparatus according to (1.), wherein the processing circuitry is configured to return the signature to the submitter separately to the data item.

(9.) An apparatus according to (8.), wherein the processing circuitry is configured to store the data item on a location within the network, and the location of the stored data item is returned to the submitter separately to the signature.

(10.) An apparatus according to (1.), wherein the data item is a batch of records, and the order of the records within the batch are ordered in accordance with a unique value attributed to the record.

(11.) An apparatus comprising communication circuitry configured to receive from a submitter, over a network, a signature of a data item to be verified, the data item being of a first data type and processing circuitry configured to: obtain the data item and to transform the data item in the first data type to a second, different, data type; remove non-significant content from the data item in the second data type; and generate a hash of the data item.

(12.) An apparatus according to (11.), wherein the processing circuitry is configured to obtain the data item of the first type from a location on the network.

(13.) A method comprising: receiving from a submitter, over a network, a data item being of a first data type; transforming the first data type to a second, different, data type; removing non-significant content from the data item in the second data type; generating a hash of the data item having non-significant content removed to be signed; and providing the hash for signing.

(14.) A method comprising: receiving from a submitter, over a network, a signature of a data item to be verified, the data item being of a first data type; obtaining the data item; transforming the data item in the first data type to a second, different, data type; removing non-significant content from the data item in the second data type; and generating a hash of the data item.

(15.) A computer program comprising computer readable instructions which, when loaded onto a computer, configures the computer to perform a method according to either one of (13.) or (14.).

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

Infoset: This is typically used in XML to describe an Information Set. XML Information Set is a W3C specification describing an abstract data model of an XML document in terms of a set of information items. An infoset can contain up to eleven different types of information items: The Document Information Item (always present); Element Information Items; Attribute Information Items; Processing Instruction Information Items; Unexpanded Entity Reference Information Items; Character Information Items; Comment Information Items; The Document Type Declaration Information Item; Unparsed Entity Information Items; Notation Information Items; and/or Namespace Information Items.

Enveloped Signature: A digital signature used to sign some part of its containing document is called an enveloped signature.

Enveloping Signature: A digital signature that contains the signed data within itself is called an enveloping signature.

Detached Signature: A digital signature used to sign a resource outside its containing document (typically XML) is called a detached signature.

What is claimed is:

1. An apparatus comprising:
communication circuitry configured to receive from a submitter, over a network, multiple components of a data item of a first data type, over time, wherein the data item is an image; and
processing circuitry configured to:
upon receipt of a predetermined number of the multiple components, but less than all of the multiple components of the data item, and for each of the received components:
transform the component from the first data type to a second, different data type; and remove non-significant content from the component in the second data type; and then after transforming and removing the non-significant content from all of the multiple components of the data item:

generate a hash of the transformed data item, which is a text string having all of the multiple components included and the non-significant content removed, to be signed; and provide the hash for signing.

2. The apparatus according to claim 1, wherein the second data type is in extensible Markup Language, XML.

3. The apparatus according to claim 1, wherein the processing circuitry is configured, in order to transform the component from the first data type to the second data type, to map data in a first field in the first data type to a corresponding second field in the second data type.

4. The apparatus according to claim 1, wherein the processing circuitry is configured, in order to remove non-significant content from the component in the second data type, to canonicalize the component in the second data type.

5. The apparatus according to claim 1, wherein the processing circuitry is configured to remove whitespace as the non-significant content.

6. The apparatus according to claim 1, wherein the processing circuitry is configured to remove carriage returns as the non-significant content.

7. The apparatus according to claim 1, wherein the processing circuitry is configured to sign the generated hash.

8. The apparatus according to claim 1, wherein the processing circuitry is configured to return the signature to the submitter separately to the data item.

9. The apparatus according to claim 8, wherein the processing circuitry is configured to store the data item on a location within the network, and wherein the location of the stored data item is returned to the submitter separately to the signature.

10. The apparatus according to claim 1, wherein the multiple components of the data item include a batch of records, and wherein the records within the batch are ordered in accordance with a unique value attributed to the record.

11. A method comprising:

receiving over time from a submitter, over a network, multiple component of a data item being of a first data type; and upon receipt of a predetermined number of the multiple components, but less than all of the multiple components, and for each of the received components:

transforming the component from the first data type to a second, different data type; and then removing non-significant content from the component of the data item in the second data type; and after transforming and removing the non-significant content from all of the multiple components of the data item:

generating a hash of the transformed data item, which is a text string having all of the multiple components included and the non-significant content removed, to be signed; and providing the hash for signing.

12. The method according to claim 11, wherein transforming the component from the first data type to the second data type includes mapping data in a first field in the first data type to a corresponding second field in the second data type.

13. The method according to claim 11, wherein removing non-significant content from the component of the data item in the second data type includes canonicalizing the component of the data item in the second data type.

14. The method according to claim 11, wherein removing non-significant content from the component of the data item in the second data type includes removing whitespace and/or carriage returns.

15. The method according to claim 11, further comprising signing the generated hash with a signature.

16. The method according to claim 15, further comprising returning the signature to the submitter separately from the data item.

17. The method according to claim 16, further comprising storing the data item on a location within the network, wherein the location of the stored data item is returned to the submitter separately from the signature.

18. The method according to claim 11, wherein the multiple components of the data item include a batch of records, and wherein the records within the batch are ordered in accordance with a unique value attributed to the record.

* * * * *